Aug. 18, 1942.  E. S. RUSSELL  2,293,405
EDUCATIONAL APPARATUS
Filed Oct. 9, 1940  2 Sheets-Sheet 1

INVENTOR.
E. Stanton Russell
BY
ATTORNEY.

Aug. 18, 1942.　　　　E. S. RUSSELL　　　　2,293,405
EDUCATIONAL APPARATUS
Filed Oct. 9, 1940　　　　2 Sheets-Sheet 2

INVENTOR.
E. Stanton Russell
BY
ATTORNEY.

Patented Aug. 18, 1942

2,293,405

UNITED STATES PATENT OFFICE 2,293,405

EDUCATIONAL APPARATUS

Elwyn Stanton Russell, Belmont, Mass., assignor to Cambosco Scientific Company, Boston, Mass., a corporation of Massachusetts Application October 9, 1940, Serial No. 360,344

6 Claims. (Cl. 35—18)

The present invention relates to educational devices and more particularly to a device for teaching the formulation of chemical compounds.

Devices of this kind have previously been suggested, but these have either been incomplete in one or more respects, or they have been too complicated and expensive for individual student use.

It is an object of the present invention to provide a chemical formula indicating device which shall be able to give the names of a great many chemical compounds, as well as the symbols used to indicate them, the valences of the radicals making up the compounds and an indication of compounds which are unknown or of doubtful existence. It is a further object of the present invention to present the above information in a form and manner which will attract and hold the attention of students beginning the study of chemistry and will effectively assist in making clear the meaning of the symbols commonly used for the designation of chemical elements and compounds, as well as in clarifying the concept of valence.

Figure 1:
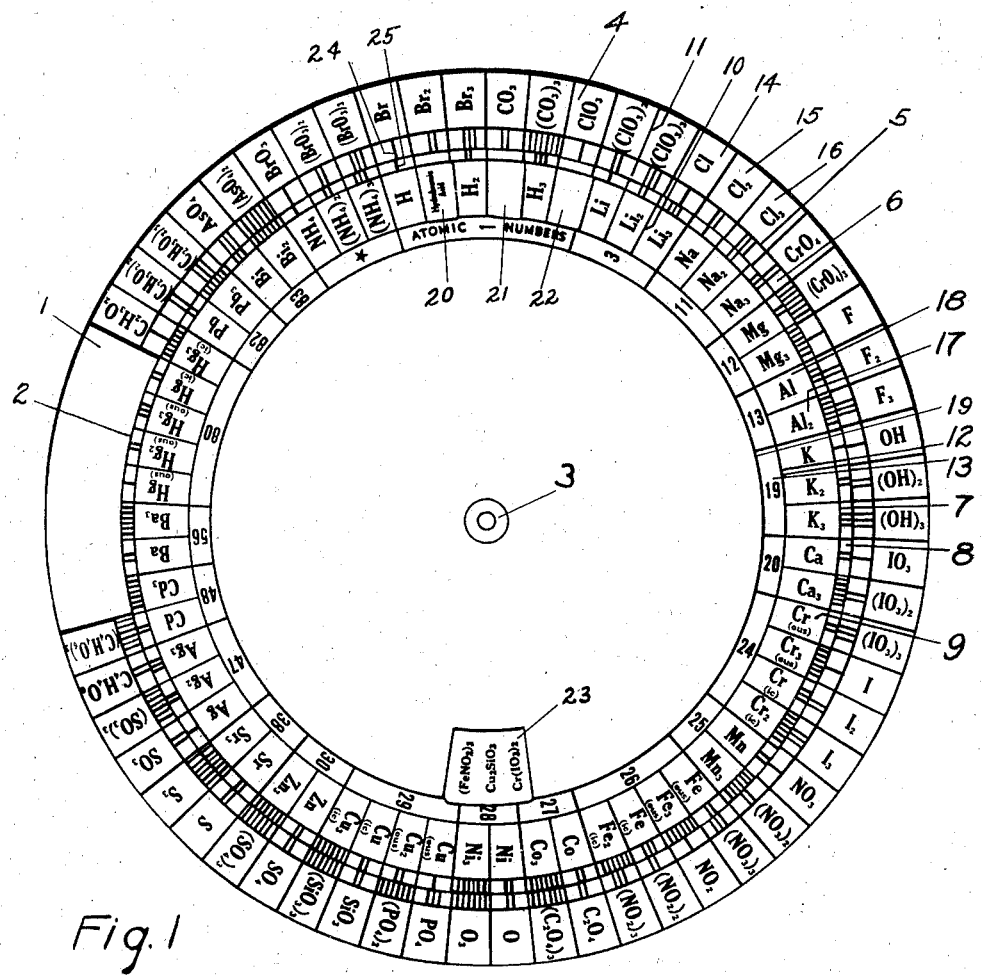
Figure 2:
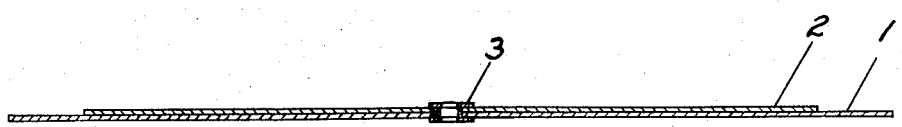
Figure 3:
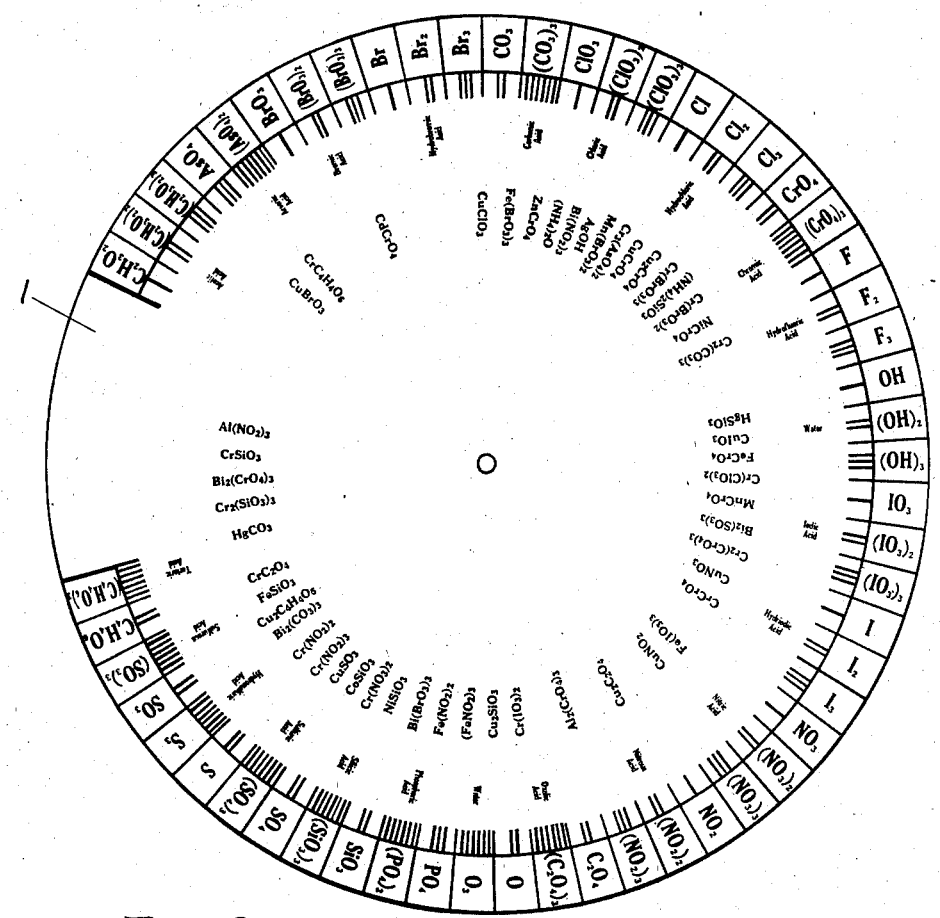

The above and other objects of the present invention will best be understood from the following description taken in connection with the accompanying drawings in which Fig. 1 shows a plan view of the assembled formula finding device; Fig. 2 shows a transverse section of Fig. 1; and Fig. 3 shows a plan view of the lower element of Fig. 1.

As shown in the drawings, my invention comprises a lower disc 1 and an upper, smaller disc 2 mounted concentrically upon the disc 1 and rotatable with respect to the same by a suitable pivot device such as the grommet 3.

The lower disc, so far as it is not obscured by the upper disc has its periphery divided by the radial lines 11 into a number of equi-angular radial segments 4. As shown the lower disc 1 has fifty-five such segmental spaces. Each of these spaces may be divided, if desired, by the concentric circular line 5, although this is not essential. In the outer annular row of spaces 6 on the lower disc 1 there are placed short radial lines, such as 24, extending up to or preferably just underneath the upper disc 2. The number of lines is equal to the valence of the negative radical in the adjacent space 4.

The upper disc 2 has its periphery divided into radial segments by the radial lines 10 of the same angular width as those on the lower disc 1. These segments are divided radially by the concentric circular line 7 into two rings of segmental spaces 8 and 9. The line 7 may, however, be omitted, if desired. In the inner ring of spaces 9 are placed the symbols of a group of positive radicals, preferably arranged in order of their atomic numbers. In the outer ring of spaces 8 are placed short radial lines, such as 25, extending to the periphery of the disc 2. These lines correspond in number to the valence of the positive radical in the adjacent space 9. Another ring of radial spaces 13 is formed by the two concentric circles 12 and 19 and some of the radial lines 10 extended inwards. In these spaces 13 are placed the atomic numbers of the positive radicals in the adjacent outer ring of spaces.

Since many radicals, both positive and negative, occur in compounds in more than a single unit, it is necessary to repeat such radicals, preferably in adjacent spaces, with the appropriate unit designation and the corresponding number of valence lines. Thus, for example, chlorine occurs in compounds frequently in units of one, two or three atoms; therefore in the ring of spaces 4 on the lower disc 1 the symbols Cl, Cl$_2$ and Cl$_3$ appear in the adjacent spaces 14, 15 and 16 respectively, and one, two and three valence lines appear in the corresponding spaces in ring 6. Similarly on disc 2 the metallic elements often occur in more than one atomic unit. Thus, for example, aluminum may occur in units of one or two atoms; the symbol for this element therefore appears twice in adjacent spaces 18 and 17 as Al and Al$_2$ with three and six valence bond lines respectively in the corresponding spaces in ring 8, aluminum being tri-valent.

Moreover, when a radical may have more than one valence, the symbol for that radical should be repeated as often as necessary to indicate the various compounds which commonly occur. Thus, for example, iron may be di- or tri-valent and may occur in units of one, two or three atoms; the symbol for this element therefore appears four times in ring 9 as Fe (-ous), Fe$_3$ (-ous), Fe (-ic) and Fe$_2$ (-ic), and the proper number of valence bonds, namely, two, six, three and six, respectively appear in the corresponding spaces in ring 8. In this case the appropriate suffixes -ous or -ic are also marked in the ring 9 to indicate whether a ferrous or a ferric compound is formed.

It will now be evident that by rotating the disc 2 with respect to the disc 1, any positive radical in ring 9 on disc 2 can be placed opposite any negative radical in ring 4 on disc 1 to indicate a compound formed of the two radicals. By matching the number of valence bonds in ring 8 on disc 2 with those in ring 6 on disc 1, the formula for the compound will be correct in all respects. Thus for the compound aluminum chloride, one of the symbols Al may be placed opposite one of the symbols Cl; but the valence bonds can be matched only when Al is placed opposite $Cl_3$. The correct formula is thus seen to be $Al \equiv Cl_3$. Similarly, in combining the iron and chlorine radicals, the student finds that there are two possible compounds, $Fe=Cl_2$ and $Fe \equiv Cl_3$ called ferrous chloride and ferric chloride, respectively. In cases where, when the valence bonds are aligned, the desired combination appears more than once, the simplest combination is the conventional formula.

It will be observed that the circular line 2 on the drawings serves to designate the edge of the upper disc 2; but this line may be and preferably is omitted in the actual construction of the device. In the preferred construction, therefore, the valence bond lines on the two discs merge together when the discs are properly set so that only one group of lines appears. Thus, for ferric chloride, the student sees the formula as $Fe \equiv Cl_3$. Any matched-bond setting of the device represents a condition of equi-valence, so that the student has no more difficulty with the formulas for compounds involving the union of a tri-valent element with a monovalent radical as in $FeCl_3$ above than with such simple compounds as NaCl. The union of a bi-valent element with a tri-valent radical as for example in $Co_3(AsO_4)_2$ appears equally simple. By the use of my device the student thus readily learns not only the valence of the various positive and negative radicals, but also the way in which combinations between them must occur.

Inasmuch as the element hydrogen in its union with a negative radical usually forms an acid whose common name is different from the mere combination of the names of the two radicals, as hydrogen bromide is called hydrobromic acid, it is desirable to provide this information. Therefore, the hydrogen symbols in the ring 9 on disc 2 are spaced apart from each other and the next succeeding element, the intervening segmental spaces being cut out to form apertures 20, 21, and 22 through which a portion of the lower disc 1 can be seen. In the proper positions on the lower disc 1 the names of the various acids are printed so that they will, when the discs are suitably positioned, show through the window located clockwise from the hydrogen symbol in question as shown for example at 20 in Fig. 1. Fig. 3 shows the spacing of the various acid symbols.

Of the more than five-hundred combinations which can be formed with my device, some will be unknown or of doubtful existence. To indicate when this is the case, a further aperture 23 is cut in the upper disc 2 within the line 19. The hypothetical compounds for every matched-bond position of the discs are printed on the lower disc 1 in the proper position so that each of them will be visible through the window 23 when the discs are positioned so that the valence bonds for that combination are matched. All the hypothetical compound symbols and their locations on the disc 1 are shown in Fig. 3.

In order to make the names of the various radicals and their symbols readily available to the student, these may conveniently be listed in the space in the center of the upper disc 2, although this list has been omitted from the drawing.

While I have described and illustrated my invention with respect to certain particular chemical compounds, it will be understood by those skilled in the art that other radicals forming other compounds may be substituted for those shown in the drawing or may be used in addition to those shown, bearing in mind, however, the principles above discussed.

Having now described my invention, I claim:

1. An educational device for teaching the formation of chemical compounds comprising a pair of relatively movable, indicia bearing members, one of said members having an edge movable along a line on the other of said members, indicia adapted to represent symbols of positive chemical radicals on the first member arranged along said edge and indicia adapted to represent symbols of negative chemical radicals on said second member arranged along said line and short lines equal in number to the valence of said respective radicals leading from each of said indicia to said edge and said line respectively, any set of valence lines on one member being adapted to match any set of valance lines of equal number on the other member, whereby when any set of said valence lines of equal number on the two members are juxtaposed, the corresponding symbols indicate the formula of the chemical compound formed by the respective positive and negative radicals.

2. An educational device for teaching the formation of chemical compounds comprising a pair of relatively movable, indicia bearing members, one of said members having an edge movable along a line on the other of said members, indicia adapted to represent symbols of positive chemical radicals on the first member arranged along said edge and indicia adapted to represent symbols of negative chemical radicals on said second member arranged along said line and short lines equal in number to the valance of said respective radicals leading from each of said indicia to said edge and said line respectively, any set of valence lines on one member being adapted to match any set of valence lines of equal number on the other member, whereby when any set of said valence lines of equal number on the two members are juxtaposed, the corresponding symbols indicate the formula of the chemical compound formed by the respective positive and negative radicals, and means operatively associated with both of said members for indicating those of such compounds which have doubtful existence.

3. An educational device for teaching the formation of chemical compounds comprising a pair of thin flat members and means mounting one of said members partly overlapping the other and relatively movable thereto, indicia adapted to represent symbols of positive chemical radicals arranged at substantially equal intervals on said first member along the overlapping edge of the same, a set of one or more substantially equally spaced short lines extending from each of said indicia to said edge, the number of lines in each set being equal to the valence of the corresponding radical, indicia adapted to represent symbols of negative chemical radicals arranged on the visible portion of said second member at intervals equal to those of said first indicia and along a line close to and substantially parallel to said overlapping edge of said first member, a set of one or more short lines spaced equal to the spacing of the valence lines on said first member extending from each of said second indicia to said overlapping edge of said first member, the number of lines in each set being equal to the valence of the corresponding negative radical, any set of valence lines on one member being adapted to match any set of valence lines of equal number on the other member, whereby when any set of said valence lines of equal number on the two members are juxtaposed, the corresponding symbols indicate the formula of the chemical compound formed by the respective positive and negative radicals.

4. An educational device for teaching the formation of chemical compounds comprising a pair of thin flat members and means mounting one of said members partly overlapping the other and relatively movable thereto, indicia adapted to represent symbols of positive chemical radicals arranged at substantially equal intervals on said first member along the overlapping edge of the same, a set of one or more substantially equally spaced lines extending from each of said indicia to said edge, the number of lines in each set being equal to the valence of the corresponding radical, indicia adapted to represent symbols of negative chemical radicals arranged on the visible portion of said second member at intervals equal to those of said first indicia and along a line close to and substantially parallel to said overlapping edge of said first member, a set of one or more short lines spaced equal to the spacing of the valence lines on said first member extending from each of said second indicia to said overlapping edge of said first member, the number of lines in each set being equal to the valence of the corresponding negative radical, any set of valence lines on one member being adapted to match any set of valence lines of equal number on the other member, whereby when any set of said valence lines of equal number on the two members are juxtaposed, the corresponding symbols indicate the formula of the chemical compound formed by the respective positive and negative radicals, and an aperture in said first member located in a portion thereof which overlaps said second member, and indicia on said second member adapted to represent chemical compounds whose existence is doubtful positioned so as to be visible through said aperture when the corresponding positive and negative radicals on the two members are juxtaposed.

5. An educational device for teaching the formation of chemical compounds comprising a pair of centrally pivoted concentric discs relatively rotatable with respect to each other, the lower disc being larger than the upper disc, indicia adapted to represent symbols of positive chemical radicals arranged at substantially equal intervals along the edge of said upper disc, a set of one or more substantially equally spaced short lines extending from each of said indicia too said edge and substantially perpendicular to the latter, the number of lines in each set being equal to the valence of the corresponding radical, indicia adapted to represent symbols of negative chemical radicals arranged on the visible portion of said lower disc at intervals equal to those of said first indicia and in a row close to and parallel to the edge of said upper disc, a set of one or more short lines spaced equal to the spacing of the valence lines on said upper disc extending from each of said second indicia to the edge of said upper disc, the number of lines in each set being equal to the valance of the corresponding negative radical, any set of valence lines on one member being adapted to match any set of valence lines of equal number on the other member, whereby when any set of said valence lines of equal number on the two discs are juxtoposed, the corresponding symbols indicate the formula of the chemical compound formed by the respective positive and negative radicals.

6. An educational device for teaching the formation of chemical compounds comprising a pair of centrally pivoted concentric discs relatively rotatable with respect to each other, the lower disc being larger than the upper disc, indicia adapted to represent symbols of positive chemical radicals arranged at substantially equal intervals along the edge of said upper disc, a set of one or more substantially equally spaced short lines extending from each of said indicia to said edge and substantially perpendicular to the latter, the number of lines in each set being equal to the valence of the corresponding radical, indicia adapted to represent symbols of negative chemical radicals arranged on the visible portion of said lower disc at intervals equal to those of said first indicia and in a row close to and parallel to the edge of said upper disc, a set of one or more short lines spaced equal to the spacing of the valence bonds on said upper disc extending from each of said second indicia to the edge of said upper disc, the number of lines in each set being equal to the valence of the corresponding negative radical, any set of valence lines on one member being adapted to match any set of valence lines of equal number on the other member, whereby when any set of said valence lines of equal number on the two discs are juxtaposed, the corresponding symbols indicate the formula of the chemical compound formed by the respective positive and negative radicals, and an aperture in said upper disc located in a portion thereof which overlaps said lower disc, and indicia on said lower disc adapted to represent chemical compounds whose existence is doubtful positioned so as to be visible through said aperture when the corresponding positive and negative radicals on the two discs are juxtaposed.

E. STANTON RUSSELL.